(12) United States Patent
Lu et al.

(10) Patent No.: US 9,476,585 B2
(45) Date of Patent: Oct. 25, 2016

(54) WATER-COOLING U-VALVE

(75) Inventors: Qinggang Lu, Beijing (CN); Yunkai Sun, Beijing (CN); Ming Gao, Beijing (CN); Shaolin Bao, Beijing (CN); Shiyuan Li, Beijing (CN); Dongyu Wang, Beijing (CN); Yongjie Na, Beijing (CN)

(73) Assignee: INSTITUTE OF ENGINEERING THERMOPHYSICS, CHINESE ACADEMY OF SCIENCES, Beijing (CN)

( * ) Notice: Subject to any disclaimer, the term of this patent is extended or adjusted under 35 U.S.C. 154(b) by 1188 days.

(21) Appl. No.: 13/380,433

(22) PCT Filed: Jun. 24, 2010

(86) PCT No.: PCT/CN2010/074380
§ 371 (c)(1),
(2), (4) Date: Dec. 22, 2011

(87) PCT Pub. No.: WO2010/149057
PCT Pub. Date: Dec. 29, 2010

(65) Prior Publication Data
US 2012/0103584 A1 May 3, 2012

(30) Foreign Application Priority Data

Jun. 24, 2009 (CN) .......................... 2009 1 0087879

(51) Int. Cl.
F28F 9/02 (2006.01)
F23C 10/26 (2006.01)
B01J 8/24 (2006.01)
B01J 8/26 (2006.01)
(Continued)

(52) U.S. Cl.
CPC .............. *F23C 10/22* (2013.01); *B01J 8/1836* (2013.01); *F22B 31/0084* (2013.01); *F23C 10/26* (2013.01); *B01J 2208/00194* (2013.01); *F23C 2206/103* (2013.01)

(58) Field of Classification Search
None
See application file for complete search history.

(56) References Cited

U.S. PATENT DOCUMENTS 1,980,785 A * 11/1934 Coulson, Jr. .............. 122/235.16
2,332,534 A * 10/1943 Rooney .......................... 122/473
(Continued)

FOREIGN PATENT DOCUMENTS

CN 2192807 Y 3/1995
CN 201273564 Y 7/2009
(Continued)

*Primary Examiner* — Gregory Huson
*Assistant Examiner* — Eric Gorman
(74) *Attorney, Agent, or Firm* — Browdy and Neimark, P.L.L.C.

(57) ABSTRACT

A water-cooling U-valve is composed of a downcomer (1), a riser (2), and a return chute (3), which are sequentially connected. An intermediate partition (4) is disposed between the downcomer (1) and the riser (2), the lower parts of the downcomer (1) and the riser (2) are interconnected. A material returning partition (5) is disposed between the riser (2) and the return chute (3), the upper parts of the riser (2) and the return chute (3) are interconnected. The casing of U-valve comprises membrane walls, the inside of the membrane walls are laid with refractory. Some water-cooling tubes of the membrane walls extend into the inside of the U-valve, forming the water cooing intermediate partition (4) and material returning partition (5). The headers (40, 50) are connected with the headers (33, 13) formed by some water-cooling tubes of membrane walls by connecting tubes (7, 8).

4 Claims, 6 Drawing Sheets

(51) Int. Cl.
  *B01J 8/38* (2006.01)
  *F22B 31/00* (2006.01)
  *F23M 5/08* (2006.01)
  *F28D 1/04* (2006.01)
  *F28F 1/00* (2006.01)
  *F23C 10/22* (2006.01)
  *B01J 8/18* (2006.01)

(56) References Cited

U.S. PATENT DOCUMENTS

| | | | | |
|---|---|---|---|---|
| 2,939,435 A * | 6/1960 | Kessler | | 122/478 |
| 3,146,759 A * | 9/1964 | Miller | | 122/478 |
| 3,146,760 A * | 9/1964 | Blodgett | | 122/478 |
| 3,284,070 A * | 11/1966 | Saichi et al. | | 432/40 |
| 3,310,041 A * | 3/1967 | Hansen et al. | | 122/510 |
| 3,324,837 A * | 6/1967 | Gorzegno et al. | | 122/406.4 |
| 3,368,534 A * | 2/1968 | Gorzegno et al. | | 122/480 |
| 3,893,426 A * | 7/1975 | Bryers | | 122/4 D |
| 4,247,302 A * | 1/1981 | Woldy et al. | | 48/197 R |
| 4,248,604 A * | 2/1981 | Woldy et al. | | 48/197 R |
| 4,251,228 A * | 2/1981 | Muenger et al. | | 48/197 R |
| 4,289,502 A * | 9/1981 | Muenger et al. | | 48/62 R |
| 4,326,856 A * | 4/1982 | Muenger et al. | | 48/197 R |
| 4,328,006 A * | 5/1982 | Muenger et al. | | 48/62 R |
| 4,328,008 A * | 5/1982 | Muenger et al. | | 48/197 R |
| 4,331,105 A * | 5/1982 | Kawamura | | F22B 29/062 122/406.4 |
| 4,377,394 A * | 3/1983 | Muenger et al. | | 48/62 R |
| 4,479,458 A * | 10/1984 | Goidich et al. | | 122/4 D |
| 4,665,864 A * | 5/1987 | Seshamani et al. | | 122/4 D |
| 4,665,865 A * | 5/1987 | Zubrod | | 122/235.12 |
| 4,813,479 A | 3/1989 | Wahlgren | | |
| 4,823,740 A * | 4/1989 | Ohshita et al. | | 122/4 D |
| 4,947,804 A * | 8/1990 | Abdulally | | 122/4 D |
| 5,014,652 A * | 5/1991 | Hyldgaard | | 122/4 D |
| 5,037,617 A * | 8/1991 | Soni | | 422/142 |
| 5,094,191 A * | 3/1992 | Garkawe et al. | | 122/4 D |
| 5,218,932 A | 6/1993 | Abdulally | | |
| 5,281,398 A | 1/1994 | Hyppanen et al. | | |
| 5,378,253 A * | 1/1995 | Daum et al. | | 55/434.4 |
| 6,631,698 B1 * | 10/2003 | Hyppanen et al. | | 122/4 D |
| 6,925,969 B1 * | 8/2005 | Brown et al. | | 122/379 |
| 7,520,249 B2 * | 4/2009 | Morin et al. | | 122/4 D |
| 8,684,070 B2 * | 4/2014 | Wessel et al. | | 165/145 |
| 2002/0189452 A1 * | 12/2002 | Benhita | | B01D 45/12 95/269 |
| 2007/0119577 A1 * | 5/2007 | Kraft et al. | | 165/157 |
| 2009/0031967 A1 * | 2/2009 | Banas et al. | | 122/4 D |
| 2014/0352634 A1 * | 12/2014 | Sullivan et al. | | 122/182.1 |
| 2015/0151219 A1 * | 6/2015 | Grave | | B01D 45/00 95/253 |
| 2016/0146452 A1 * | 5/2016 | Wang | | F23C 10/08 110/245 |

FOREIGN PATENT DOCUMENTS

| | | |
|---|---|---|
| CN | 101596433 A | 12/2009 |
| CN | 201427045 Y | 3/2010 |
| EP | 0293594 A1 | 12/1988 |
| EP | 2455158 A1 | 5/2012 |
| JP | 1184301 A | 7/1989 |
| WO | 9422571 A1 | 10/1994 |

* cited by examiner

WATER-COOLING U-VALVE

FIELD OF THE INVENTION

The present invention relates to the field of solid material returning technology, and, in particular to the water-cooling U-valve for circulating fluidized beds.

DESCRIPTION OF THE RELATED ARTS

In the material circulating circuit of the circulating fluidized bed, the loop seal plays an extremely key role. The common types of loop seal are as follows: L-valve; J-valve; sealed delivery pot, and U-valve, etc. Currently, U-valve is the most popular.

According to the wall surface cooling condition, the loop seal may be classed into two categories, that is, the cooling loop seal and the thermal insulation loop seal; and the latter one is more popular. However, in the material circulating circuit at high temperature, for example in the equipments such as circulating fluidized bed boiler and circulating fluidized bed incinerator, there are two challenges for the common thermal insulation loop seal at high temperature. First, the unburned carbon can be combusted in the loop seal, and it's hard to control the temperature, especially, it is prone to be coked for the fuel with lower ash fusion point, for example, when the biomass fuel is fired. Second, the thermal insulation loop seal and the membrane walls of the furnace have different expansion extents and the expansion difference between them can only be adjusted by expansion joint, and however the expansion joint is easy to be cracked during the operation, which may reduce the stability of the equipment's operation.

When the cooling loop seal especially by drum water work with the water-cooling cyclone, the expansion difference between the loop seal and membrane walls may be eliminated, and thus the expansion joint may not be needed, which will simplify the equipments. Further, circulating particles temperature in the cooling loop seal would be reduced so that the material temperature can be efficiently controlled and kept much lower than the coking temperature, which is helpful for the safe operation.

However, the casing of current water-cooling U-valve is usually membrane walls, and intermediate partition between the downcomer and riser and material returning partition between the riser and return chute are made of refractory. Thus, expansion coefficients of the partitions and the casing are different and the gap will easily occur between them especially during the start-up and the shut-down of the equipments. Once the circulating particles enter the gap, the partitions are likely to be cracked, which will greatly affect the performance of the loop seal.

SUMMARY OF THE INVENTION

Accordingly, the objective of the present invention is to provide a type of water-cooling U-valve, in which the intermediate and the material returning partitions are cooled along with the casing of the loop seal together, so that not only there is no expansion difference between the partitions and the casing, but also the working life of the partitions can be prolonged, which enables the long-term safe and stable operation of the loop seal.

In order to achieve the above-mentioned objective, the present invention provides at least the following technical solutions:

Water-cooling U-valve is composed of downcomer 1, riser 2, and return chute 3, which are sequentially connected, and all of which has a rectangular cross-section; an intermediate partition 4 is disposed between the downcomer 1 and the riser 2, the lower parts of which are interconnected; a material returning partition 5 is disposed between the riser 2 and the return chute 3, the upper parts of which are interconnected; and an air distribution plate 6 is disposed at the bottom of downcomer 1 and riser 2; the casing of the loop seal is membrane walls, including the front wall 11 of the downcomer, the top plate 21 of the riser, and the front wall 31 of the return chute; the rear wall 12 of the downcomer, the air distribution plate 6, the rear wall 32 and the left and right walls of the return chute; the inside of the membrane walls are laid with refractory; wherein:

I.) the intermediate partition 4 and material returning partition 5 which is water-cooling are formed by extending some water-cooling tubes of membrane walls into the loop seal, and the both sides and ends of the intermediate partition 4 and material returning partition 5 are laid with refractory;

II.) both the intermediate partition 4 and the material returning partition 5 are provided with headers to connect with the headers formed by some water-cooling tubes of the membrane walls by connecting tubes 7, 8;

III.) an annular header 30 is provided at the material returning opening where the return chute 3 and furnace are connected, wherein the header 30 for the material returning opening is an inlet header for the cooling medium of the loop seal and connected with the downcomer of drum; and an annular outlet header 10 for the loop seal is provided at the top of the downcomer 1, wherein the outlet header 10 is an outlet header for the cooling medium of the loop seal and connected with the middle part of the drum or is connected with the drum through the water-cooling tubes of the cyclone; and IV.) a horizontal header 33 of the front wall of the return chute is provided in the middle of the front wall 31 of the return chute, and a horizontal header 13 of the rear wall of the downcomer is provided in the middle of the rear wall 12 for the downcomer; wherein, one of each two adjacent water-cooling tubes at the front wall 31 of the return chute from the header 30 for the material returning opening is diverted and connected with the header 33 of the front wall of the return chute; and, one of each two adjacent water-cooling tubes at the rear wall 12 of the downcomer into the outlet header 10 for the loop seal is diverted and connected with the header 13 at the rear wall of the downcomer.

The features I.) and II.) of the water-cooling U-valve may further include the following:

wherein one of each two adjacent water-cooling tubes at the rear wall 32 of the return chute is diverted at the interface between the rear wall 32 of the return chute and air distribution plate 6, and is bent vertically upward into the loop seal, and finally into a header 50 for the material returning partition, forming the material returning partition 5; wherein the water-cooling tubes of the material returning partition 5 is provided in the vertical direction and both sides and the top of the material returning partition 5 are laid with refractory; wherein the header 50 for the material returning partition is provided in the horizontal direction and located at the top of the material returning partition 5, and the highest level of the header 50 is not higher than that of the header 13 for the rear wall of the downcomer, and the header 50 and the header 13 are connected by the connecting tube 8 for the headers;

wherein one of each two adjacent water-cooling tubes at the front wall 11 of the downcomer is diverted at the interface between the front wall 11 of the downcomer and the top plate 21 of the riser, and then extends into the loop seal in the vertically downward direction, and finally into a header 40 for the intermediate partition, forming the intermediate partition 4; wherein the water-cooling tubes of the intermediate partition 4 are provided in the vertical direction, and both sides and the bottom of the intermediate partition 4 are laid with refractory; wherein the header 40 for the intermediate partition is provided in the horizontal direction and located at the bottom of the intermediate partition 4; and the lowest level of the header 40 is not lower than that of the header 33 for the front wall of the return chute, and the header 40 and the header 33 are connected by the connecting tube 7 for the headers.

Wherein a left header 501 and a right header 502 both for the material returning partition 5 are provided vertically at the outsides of the left and right walls of the loop seal, respectively; wherein one of each two adjacent water-cooling tubes at the rear wall 32 of the return chute is diverted at the interface between the rear wall 32 and the air distribution plate 6, and bent vertically upward into the loop seal, and then the diverted water-cooling tubes are split into the left half and right half in the plane of the material returning partition 5, and bent in the left and right directions respectively in order to horizontally extend out of the casing of the loop seal, and finally enter the headers 501 and 502 for the material returning partition 5, respectively; wherein the highest levels of the two headers 501 and 502 for the material returning partition 5 are not higher than that of the horizontal header 13 for rear wall of the downcomer; wherein the two headers 501 and 502 for the material returning partition and the horizontal header 13 for rear wall of the downcomer are connected by the connecting tube 8 for the headers; and wherein a left header 401 and a right header 402 both for the intermediate partition 4 are provided at the outsides of the left and right walls of the loop seal, respectively; wherein one of each two adjacent water-cooling tubes at the front wall 11 of the downcomer is diverted at the interface between the front wall 11 and the top plate 21 of the riser, and extends into the loop seal in the vertically downward direction, and then the diverted water-cooling tubes are split into the left half and right half in the plane of the intermediate partition 4, and bent in the left and right directions respectively in order to horizontally extend out of the casing of the loop seal; and finally enter the two headers 401 and 402 for the intermediate partition, respectively; wherein the lowest levels of the two headers 401 and 402 are not lower than that of the header 33 for the front wall of the return chute; wherein the two headers 401 and 402 for the intermediate partition and the header 33 for the front wall of the return chute are connected by the connecting tube 7 for the headers.

According to the present invention, an integrated design for the casing and the internal partitions of the water-cooling loop seal is achieved. The circuit of the medium is smooth. Not only there is no expansion difference between the casing and the partitions, but also the working life of the partitions is prolonged. All these can ensure the long-term safe and stable operation of the loop seal.

BRIEF DESCRIPTION OF THE DRAWINGS

DETAILED DESCRIPTION OF PREFERRED EMBODIMENTS OF THE INVENTION $1^{st}$ Embodiment The water-cooling U-valve shown in FIG. 1, FIG. 2 and FIG. 3 is composed of the downcomer 1, riser 2, and return chute 3, which are sequentially connected, and each of which has a rectangular cross-section. An intermediate partition 4 is disposed between the downcomer 1 and riser 2, and the lower parts of the downcomer 1 and riser 2 are interconnected. A material returning partition 5 is disposed between the riser 2 and return chute 3, the upper parts of which are interconnected. An air distribution plate 6 is disposed at the bottom of the downcomer 1 and the riser 2.

Figure 1:
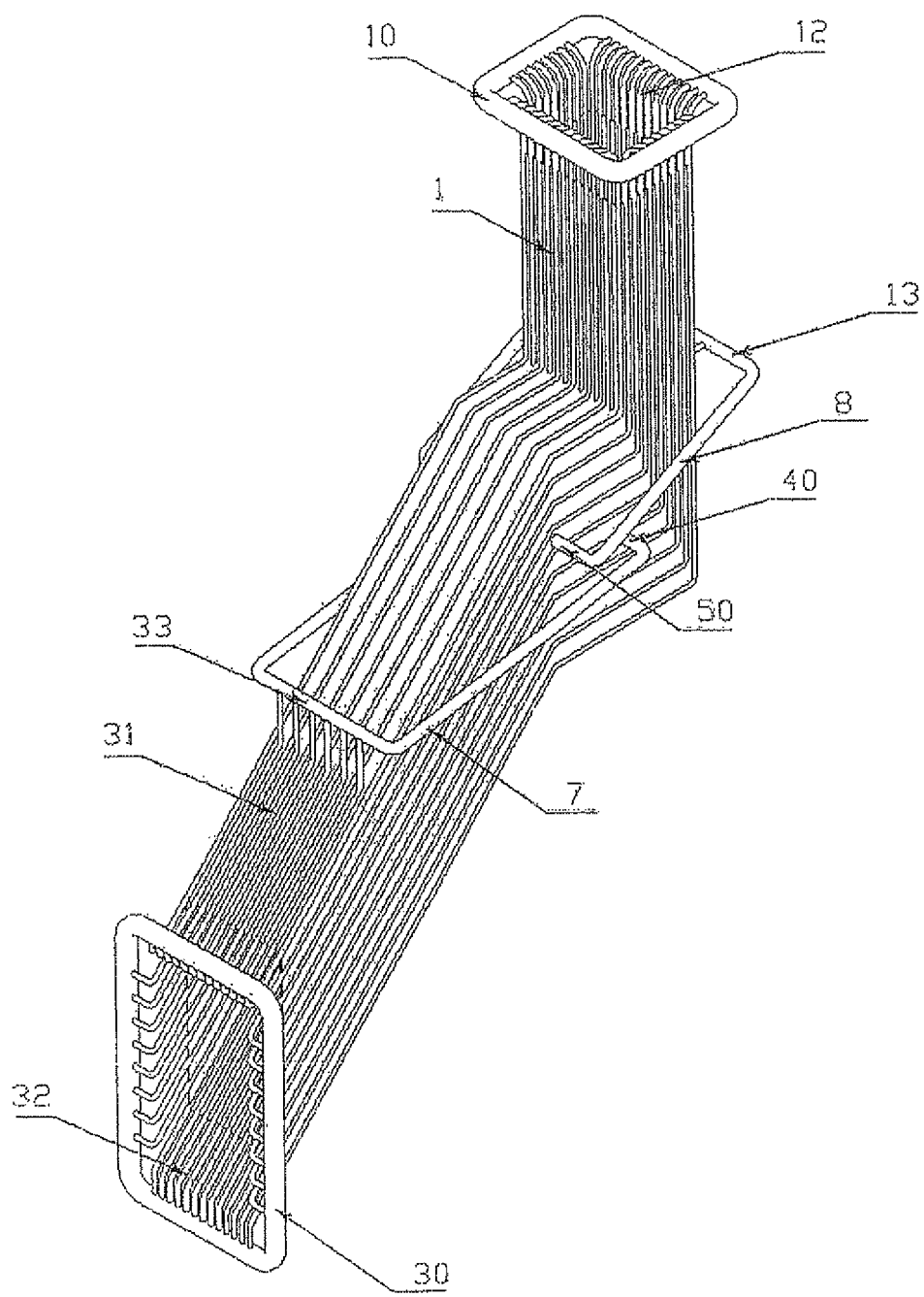
FIG. 1 is an apparent schematic view of water-cooling U-valve according to the first embodiment of the present invention.

The casing of the loop seal includes four sheets of membrane walls, that is, a front sheet constituted by the front wall 11 of the downcomer, the top plate 21 of the riser, and the front wall 31 of the return chute; a rear sheet constituted by the rear wall 12 of the downcomer, air distribution plate 6, the rear wall 32 of the return chute; and, the left and right walls of the casing of the loop seal constituted by the left and right walls of the downcomer 1, riser 2, return chute 3, respectively. The insides of the above mentioned membrane walls are laid with refractory.

An annular header 30 is provided at the material returning opening where the return chute 3 is connected with the furnace, and an annular outlet header 10 for the loop seal is provided at the top of the downcomer 1. The header 30 for the material returning opening is an inlet header for the cooling medium of the loop seal and connected with the downcomer of drum, while the outlet header 10 for the loop seal is an outlet header for the cooling medium of the loop seal and connected with the upper part of the drum or is connected with the drum through the water-cooling tubes of the cyclone.

Figure 2:
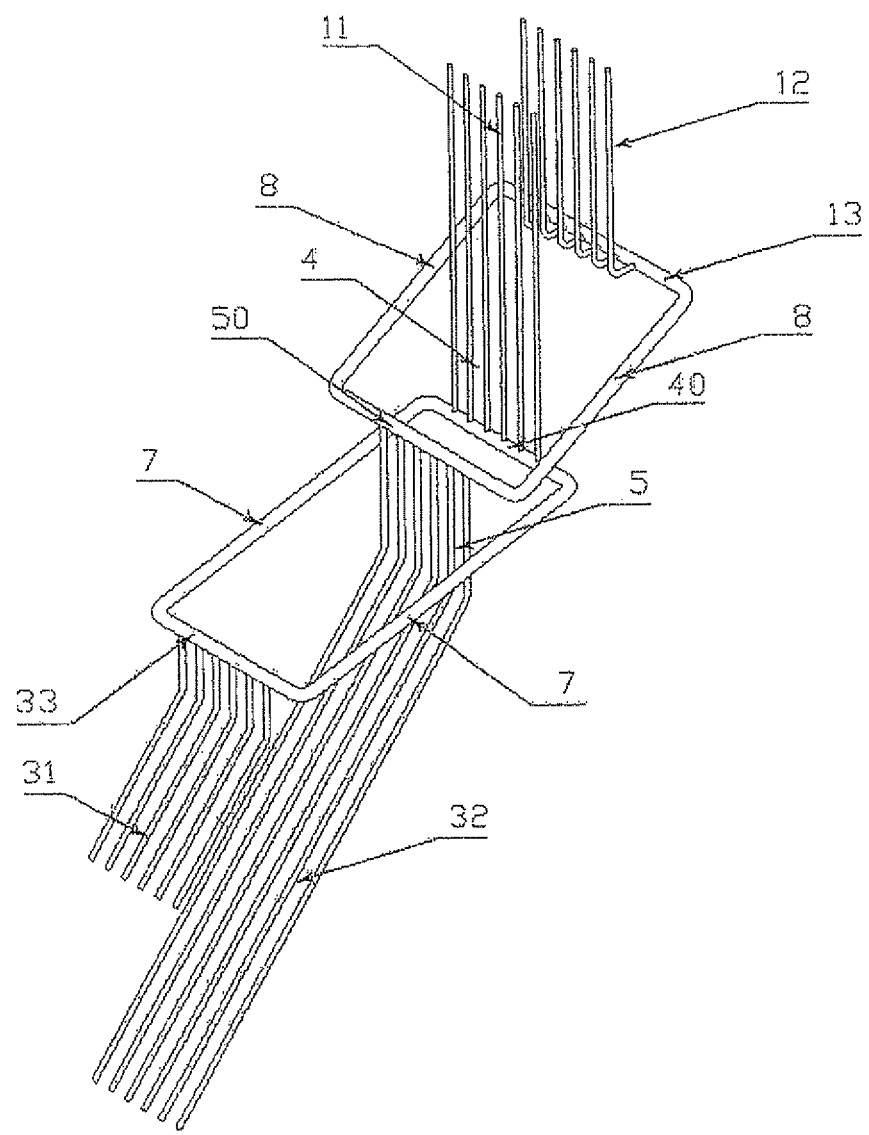
FIG. 2 is a schematic view of partitions, headers and connecting tubes for the headers in the water-cooling U-valve according to the first embodiment.
Figure 3:
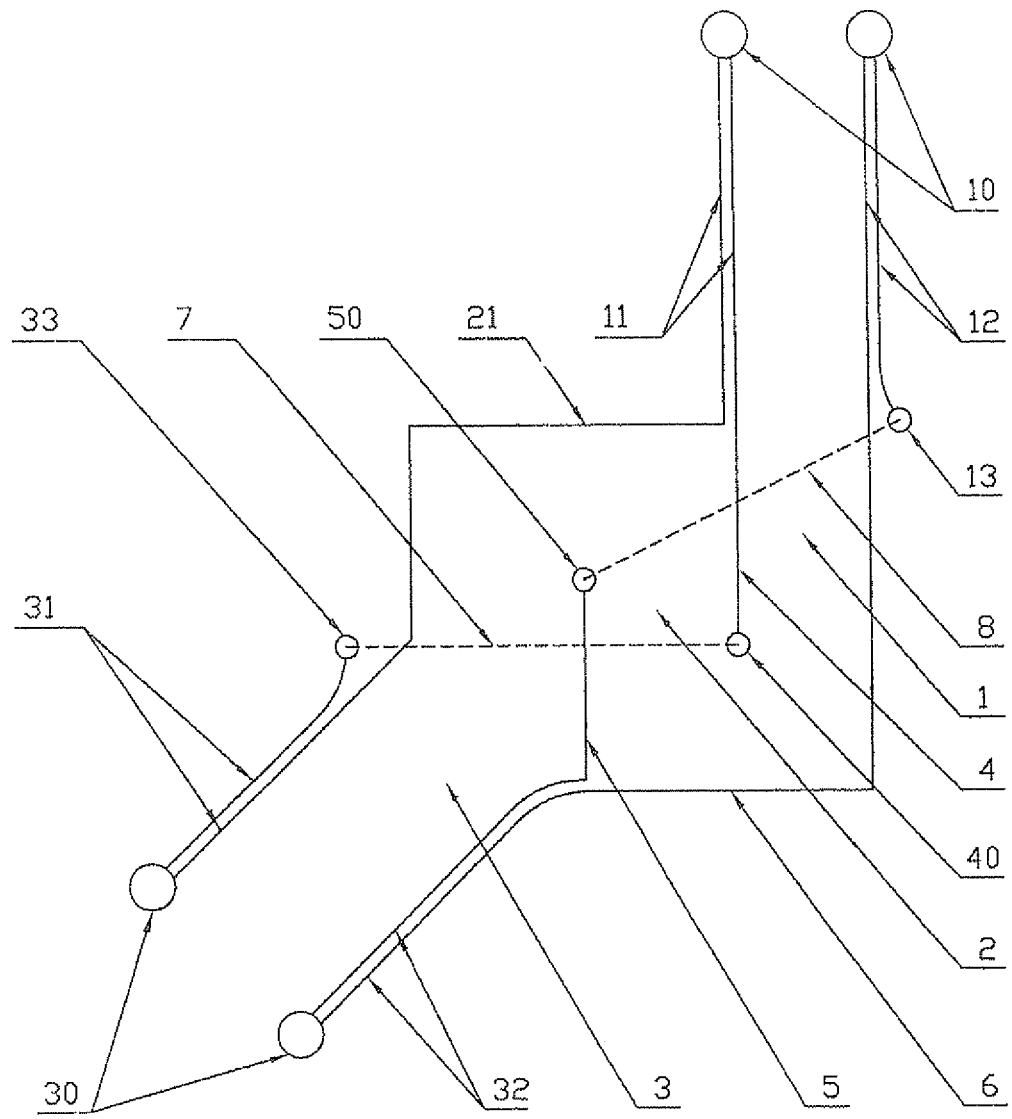
FIG. 3 is a flow process schematic chart of medium in the water-cooling U-valve according to the first embodiment.

FIG. 2 is a schematic view of partitions, headers and connecting tubes for the headers, in which refractory and fins among the tubes are not shown in order to clearly observe the arrangement of the water-cooling tubes; in fact, there are fins among the water-cooling tubes of the partition for laying refractory. A horizontal header 33 for the front wall of the return chute is provided in the middle of the front wall 31 of the return chute, and, a horizontal header 13 for the rear wall of the downcomer is provided in the middle of the rear wall 12 of the downcomer. At the front wall 31 of the return chute, one of each two adjacent water-cooling tubes from the header 30 for the material returning opening is diverted and connected with the header 33 for the front wall of the return chute; and, at the rear wall 12 of the downcomer, one of each two adjacent water-cooling tubes into the outlet header 10 for the loop is diverted and connected with the header 13 for the rear wall of the downcomer. That is to say, one half of the water-cooling tubes at the front wall 31 of the return chute finally enter the outlet header 10 for the loop seal, while the other half from the header 30 for the material returning opening only extend to the middle of the front wall 31 of the return chute and end at the header 33 for the front wall of the return chute; also, at the upper part of the rear wall 12 of the downcomer, only one half of the water-cooling tubes come from the header 30 for the material returning opening, while the other half are from the header 13 for the rear wall of the downcomer and end at the outlet header 10 for the loop seal.

One of each two adjacent water-cooling tubes at the rear wall 32 of the return chute is diverted at the interface between the rear wall 32 and the air distribution plate 6, and bent in the vertically upward direction in order to extend into the loop seal, and finally into the horizontal header 50 for the material returning partition, forming the material returning partition 5. Both sides and the top of the material returning partition 5 are laid with refractory. The header 50 for the material returning partition is located lower than the header 13 for the rear wall of the downcomer, and they are connected by the connecting tubes for the headers.

One of each two adjacent water-cooling tubes at the front wall 11 of the downcomer is diverted at the interface between the front wall 11 and top plate 21 of the riser, and then extends into the loop seal in the vertically downward direction, and finally into the horizontal header 40 for the intermediate partition, forming the intermediate partition 4. Both sides and the bottom of the intermediate partition 4 are laid with refractory. The header 40 for the intermediate partition is located at the same level with the header 33 for the front wall of the return chute, and they are connected by the connecting tubes for the headers.

During the operation, the water from the downcomer of drum enters the loop seal through the header 30 for the material returning opening. Most of the water runs upwardly along the four sheets, i.e., the front, the rear, the left, and the right sheets of the casing of the loop seal, respectively, and finally enters the outlet header 10 for the loop seal. A fraction of the water runs along the direction of the front wall 31 of the return chute, the header 33 for the front wall of the return chute, the connecting tube 7 for the headers, and the header 40 for the intermediate partition, the intermediate partition 4 and the front wall 11 of the downcomer, and finally enters the outlet header 10 for the loop seal. And another fraction of the water runs along the direction of the rear wall 32 of the return chute, the material returning partition 5, the header 50 for the material returning partition, the connecting tube 8 for the headers, and the rear wall 12 of the downcomer, and also finally enters the outlet header 10 for the loop seal.

2$^{nd}$ Embodiment

Figure 4:
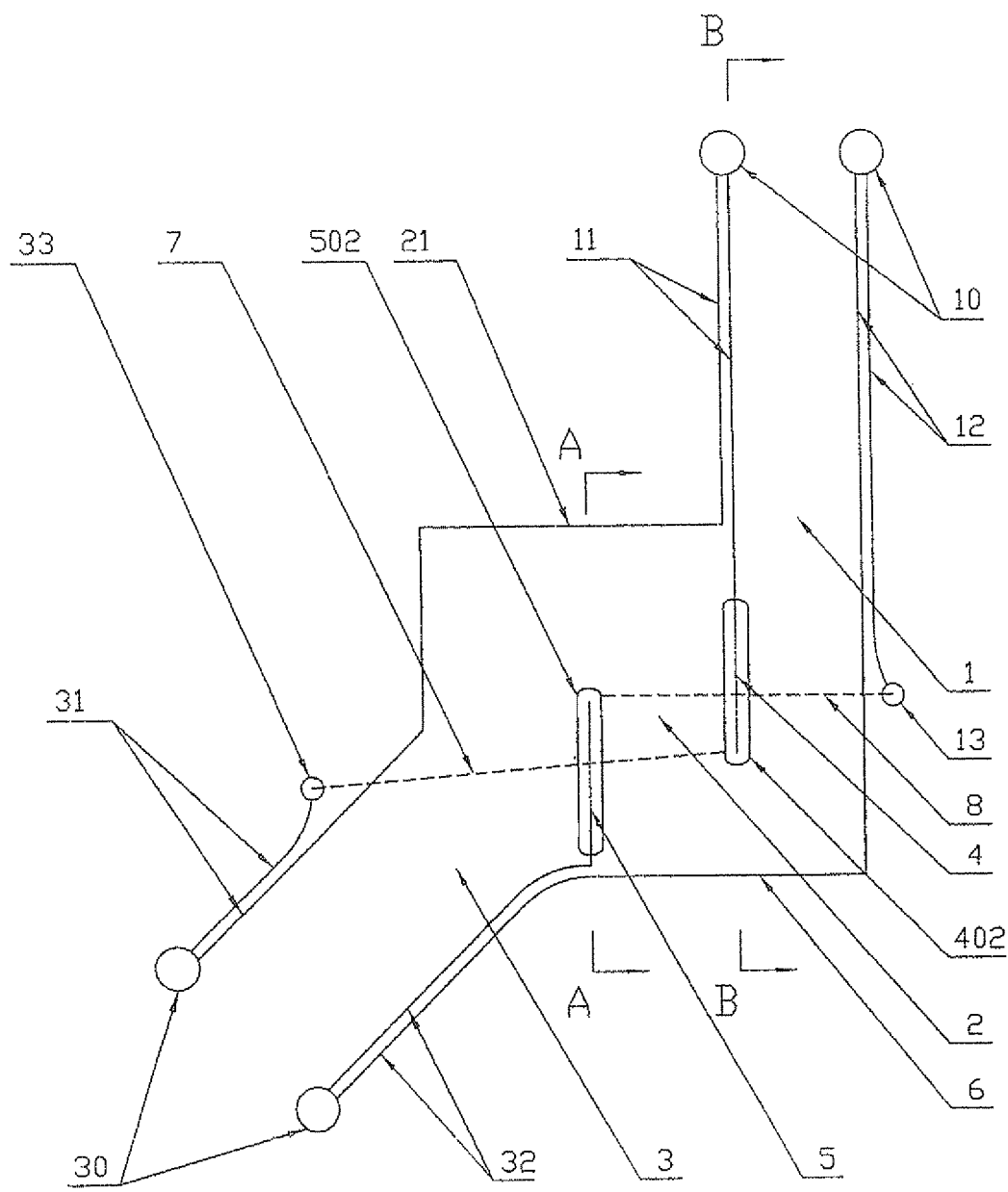
FIG. 4 is a flow process schematic chart of medium in the water-cooling U-valve according to the second embodiment of the present invention.

The water-cooling U-valve shown in FIG. 4 is composed of the downcomer 1, riser 2, and return chute 3, which are sequentially connected and each of which has a rectangular cross-section. An intermediate partition 4 is disposed between the downcomer 1 and riser 2, the lower parts of which are interconnected. A material returning partition 5 is disposed between the riser 2 and the return chute 3, the upper parts of which are interconnected. An air distribution plate 6 is disposed at the bottom of the downcomer 1 and the riser 2.

The casing of the loop seal includes four sheets of membrane walls, that is, a front sheet constituted by the front wall 11 of the downcomer, the top plate 21 of the riser, and the front wall 31 of the return chute; a rear sheet constituted by the rear wall 12 of the downcomer, air distribution plate 6, the rear wall 32 of the material return chute; and, the left and right walls of the casing of the loop seal constituted by the left and right walls of the downcomer 1, riser 2, return chute 3, respectively. The insides of the above mentioned membrane walls are laid with refractory.

An annular header 30 is provided at the material returning opening where the return chute 3 is connected with the furnace and an annular outlet header 10 for the loop seal is provided at the top of the downcomer 1. The header 30 for the material returning opening is an inlet header for the cooling medium of the loop seal and connected with the downcomer of drum, while the outlet header 10 for the loop seal is an outlet header for the cooling medium of the loop seal and connected with the upper part of the drum or is connected with the drum through the water-cooling tubes of the cyclone.

A horizontal header 33 for the front wall of the return chute is provided in the middle of the front wall 31 of the return chute, and, a horizontal header 13 for the rear wall of the downcomer is provided in the middle of the rear wall 12 of the downcomer. At the front wall 31 of the return chute, one of each two adjacent water-cooling tubes from the header 30 for the material returning opening is diverted and connected with the header 33 for the front wall of the return chute; and, at the rear wall 12 of the downcomer, one of each two adjacent water-cooling tubes into the outlet header 10 for the loop seal is diverted and connected with the header 13 for the rear wall of the downcomer. That is to say, one half of the water-cooling tubes at the front wall 31 of the return chute finally go into the outlet header 10 for the loop seal, while the other half from the header 30 for the material returning opening only extend to the middle of the front wall 31 of the return chute and end at the header 33 for the front wall of the return chute; also, at the upper part of the rear wall 12 of the downcomer, only one half of the water-cooling tubes come from the header 30 for the material returning opening, while the other half are from the header 13 for the rear wall of the downcomer and end at the outlet header 10 for the loop seal.

Figure 5:
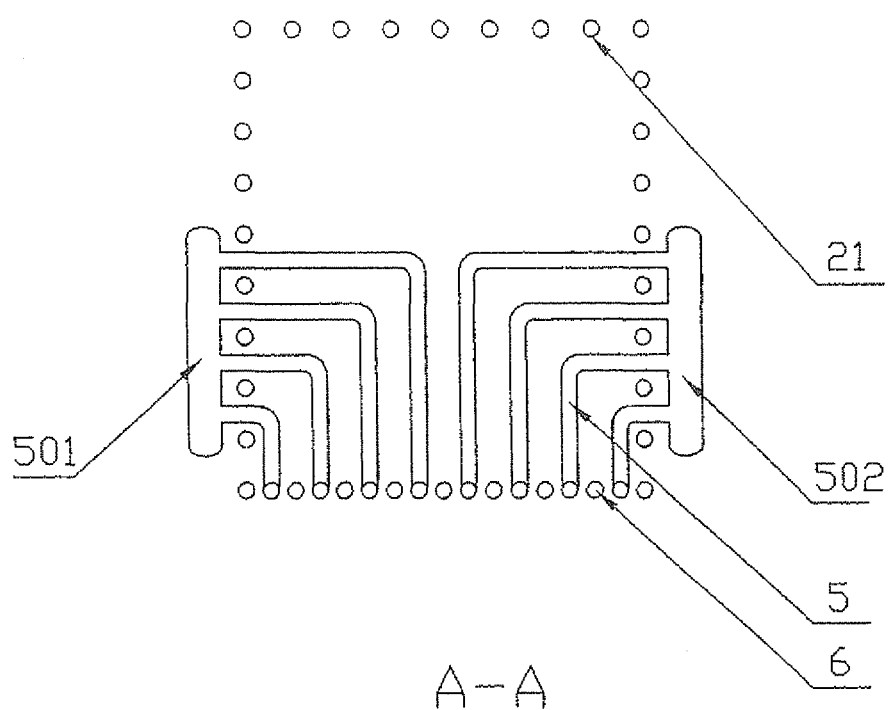
FIG. 5 is a cross-sectional schematic view of the water-cooling U-valve according to the second embodiment along the line A-A.

FIG. 5 displays the shape of water-cooling tubes of the material returning partition, in which refractory and fins among the tubes are not shown for the sake of clear observation; in fact, there are fins among the water-cooling tubes of the partition for laying refractory. One of each two adjacent water-cooling tubes at the rear wall 32 of the return chute is diverted at the interface between the rear wall 32 of the return chute and the air distribution plate 6, and bent in the vertically upward direction in order to extend into the loop seal. In the plane where the vertical segments of these tubes are placed, half of the water-cooling tubes at the left side turn left and the half of the tubes at the right side turn right, and then they are bent to extend out of the casing of the loop seal in the horizontal direction. Then, they are converged into the left vertical header 501 for the material returning partition at the outside of the left wall of the casing of the loop seal and the right vertical header 502 for the material returning partition at the outside of the right wall of the casing of the loop seal, respectively. The highest levels of the headers 501 and 502 for the material returning partition and that of the horizontal header 13 for the rear wall of the downcomer are located at the same level. The headers 501 and 502 for the material returning partition and the horizontal header 13 for the rear wall of the downcomer are connected by the connecting tube 8 for the headers. The flat plate shaped by both the bent tubes at the left and right sides forms the material returning partition 5. Both sides and the top of the material returning partition 5 are laid with refractory.

Figure 6:
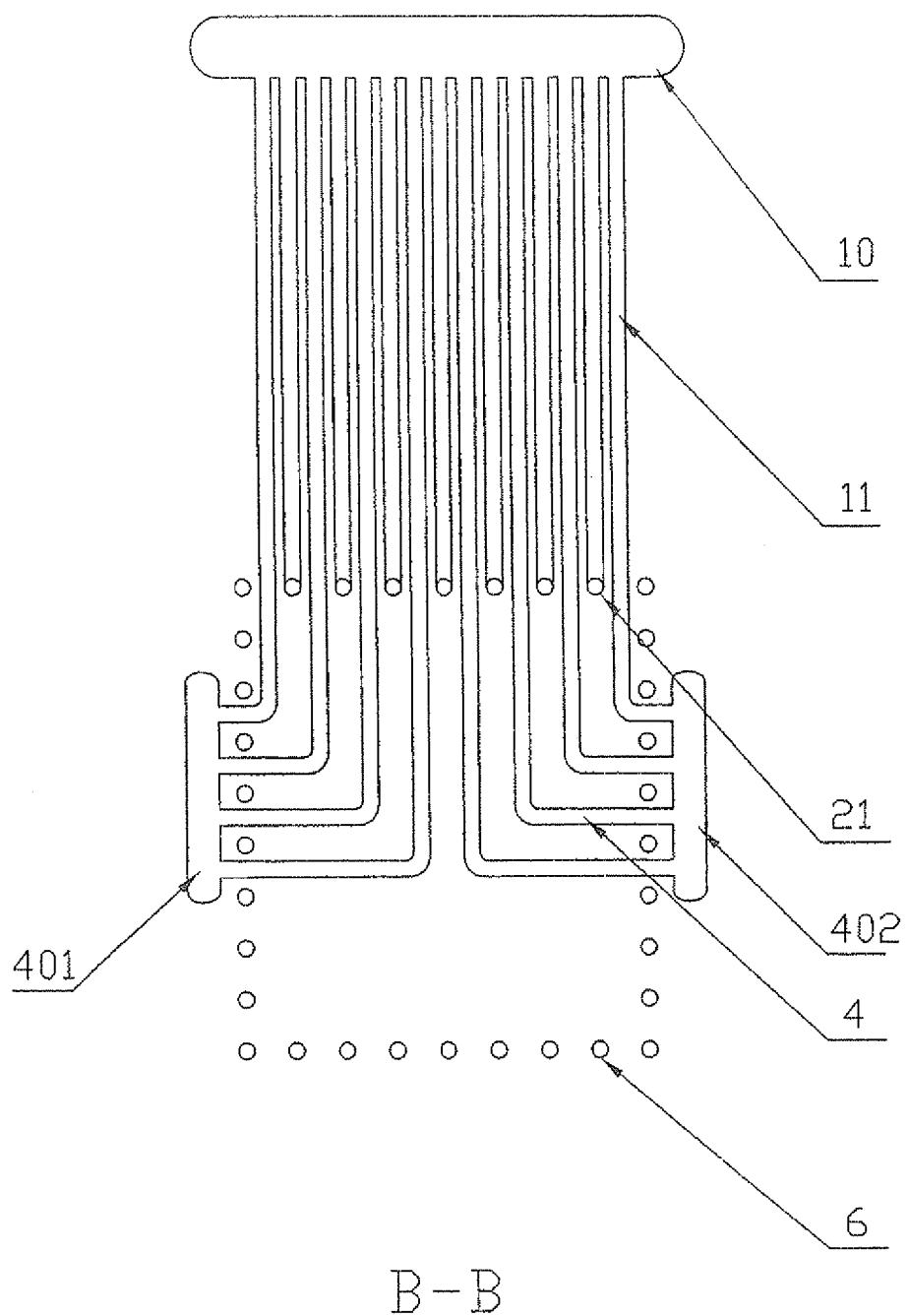
FIG. 6 is a cross-sectional schematic view of the water-cooling U-valve according to the second embodiment along the line B-B.

FIG. 6 demonstrates the shape of water-cooling tubes of the intermediate partition, in which refractory and fins among the tubes are not shown for the sake of clear observation. One of each two adjacent water-cooling tubes at the front wall 11 of the downcomer is diverted at the interface between the front wall 11 of the downcomer and the top plate 21 of the riser, and then extends into the loop seal in a vertically downward direction. In the plane where the vertical segments of these tubes are placed, the half of the water-cooling tubes at the left side turn left and the half of the water-cooling tubes at the right side turn right, and then they are bent to extend out of the casing of the loop seal in the horizontal direction. Then, they are converged into the left vertical header 401 for the intermediate partition at the outside of the left wall of the casing of the loop seal and the right vertical header 402 for the intermediate partition at the outside of the right wall of the casing of the loop seal, respectively. The lowest levels of the headers 401 and 402 for the intermediate partition are higher than that of the header 33 for the front wall of the return chute, and they are connected by the connecting tube 7 for the headers. The flat plate shaped by both the bent tubes at the left and right sides forms the intermediate partition 4. The both sides and the top of the intermediate partition 4 are laid with refractory.

During the operation, the water from the downcomer of drum enters the loop seal through the header 30 for the material returning opening. Most of the water runs upwardly along the four sheets, i.e., the front, the rear, the left, and the right sheets of the casing of the loop seal, respectively, and finally enters the outlet header 10 for the loop seal. A fraction of the water runs along the direction of the front wall 31 of the return chute, the header 33 for the front wall of the return chute, the connecting tube 7 for the headers, and the headers 401 and 402 for the intermediate partition, the intermediate partition 4 and the front wall 11 of the downcomer, and finally enter the outlet header 10 for the loop seal. And another fraction of the water runs along the direction of the rear wall 32 of the return chute, and the material returning partition 5, the headers 501 and 502 for the material returning partition, the connecting tube 8 for the headers, and the rear wall 12 of the downcomer, and also finally enters the outlet header 10 for the loop seal.

Principle of the Present Invention

Since the drum water from the downcomer of drum is used as the cooling medium in the loop seal, the medium in the loop seal and membrane walls of the furnace have the same temperature and coefficient of expansion. In this way, when it is used along with the water-cooling cyclone in which the drum water is used for cooling, expansion differences between the furnace and cyclone and loop seal may be eliminated and expansion joints may not be needed, which greatly simplify the equipments. However, the medium circuitry design of the loop seal becomes complicated and difficult because the drum water runs in a natural circulation manner, i.e., from bottom to top.

The present invention adopts a skill-oriented diversion manner so that on the one hand the water-cooling partitions are formed by allowing the membrane wall at the casing to extend into the inside of the loop seal, and on the other hand two headers are formed by diverting half of the water-cooling tubes at the rear wall of the downcomer and those at the front wall of the return chute of the loop seal and connected with the medium headers of two partitions, forming medium circulation.

The invention claimed is:

1. A water-cooling U-valve composed of:
a downcomer (1), a riser (2), and a return chute (3), which are sequentially connected, and each of which has a rectangular cross-section; an intermediate partition (4) disposed between the downcomer (1) and the riser (2), and the lower parts of the downcomer (1) and the riser (2) are interconnected; a material returning partition (5) disposed between the riser (2) and the return chute (3), and the upper parts of the riser (2) and the return chute (3) are interconnected; and, an air distribution plate (6) disposed at the bottoms of the downcomer (1) and the riser (2); a casing of a loop seal comprising membrane walls, including a front wall (11) of the downcomer (1), a top plate (21) of the riser (2), and a front wall (31) of the return chute (3); a rear wall (12) of the downcomer (1), a rear wall (32) of the return chute (3); and left and right walls; insides of the membrane walls are laid with refractory; wherein:

I.) the material returning partition (5) for water-cooling comprises a first plurality of water-cooling tubes at a rear wall (32) of return chute (3), alternate ones of which extend into the loop seal, and intermediate partition (4) for water-cooling comprises a second plurality of water-cooling tubes at the front wall (11) of the downcomer (1) extending into the loop seal, wherein both sides and the tops of the intermediate partition (4) and the material returning partition (5) are laid with refractory;

II.) the intermediate partition (4) comprises a first header (40) and the material returning partition (5) comprises a second horizontal header (50);

III.) an annular third header (30) is provided at a material returning opening, wherein the third header (30) for the material returning opening is an inlet header for a cooling medium of the loop seal and connected with a downcomer of a drum; and an annular outlet header (10) for the loop seal is provided at the top of the downcomer (1), wherein the outlet header (10) for the loop seal is an outlet header for the cooling medium of the loop seal and is connected with the drum;

IV.) said U-valve further comprises a horizontal fourth header (33), provided in the middle of the front wall (31) of the return chute (3), and a horizontal fifth header (13) for the rear wall (12) of the downcomer (1), provided in the middle of the rear wall (12) of the downcomer (1), and a third plurality of water-cooling tubes extending from said third header (30); wherein, at the front wall (31) of the return chute (3), one of each two adjacent water-cooling tubes of the third plurality of water-cooling tubes from the third header (30) for the material returning opening is diverted and connected with the horizontal fourth header (33) for the front wall (31) of the return chute (3); and, at the rear wall (12) of the downcomer (1), one of each two adjacent water-cooling tubes of a fourth plurality of water-cooling tubes extend into the outlet header (10) for the loop seal and are diverted and connected with the horizontal fifth header (13) for the rear wall (12) of the downcomer (1); and V.) the first header (40) for the intermediate partition (4) is connected with the horizontal fourth header (33) for the front wall (31) of the return chute (3), through first connecting tubes (7) for the headers (33, 40), and, the second horizontal header (50) for the material returning partition (5) is connected with the horizontal fifth header (13) for the rear wall (12) of the downcomer (1), through second connecting tubes (8) for the headers (13, 50).

2. The water-cooling U-valve according to claim 1 wherein one of each two adjacent water-cooling tubes of the first plurality of water-cooling tubes at the rear wall (32) of the return chute (3) is diverted at an interface between the rear wall (32) of the return chute (3) and the air distribution plate (6), and is bent in a vertically upward direction in order to extend into the loop seal, and finally enters the second horizontal header (50) for the material returning partition (5), forming the material returning partition (5); wherein the first plurality of water-cooling tubes of the material returning partition (5) are provided in a vertical direction and both sides and the top of the material returning partition (5) are laid with refractory; wherein the second horizontal header (50) for the material returning partition (5) is provided in a vertical direction and is located at the top of the material returning partition (5), and the highest level of the second horizontal header (50) for the material returning partition (5) is not higher than that of the horizontal fifth header (13) for the rear wall (12) of the downcomer (1), and both the second horizontal header (50) for the material returning partition (5) and the horizontal fifth header (13) for the rear wall (12) of the downcomer (1) are connected by the second connecting tubes (8) for the headers (13, 50); and wherein one of each two adjacent water-cooling tubes of the second plurality of water-cooling tubes at the front wall (11) of the downcomer (1) is diverted at an interface between the front wall (11) of the downcomer (1) and the top plate (21) of the riser (2), and then extends in a vertically downward direction into the loop seal, and finally goes into the first header (40) for the intermediate partition (4), forming the intermediate partition (4); wherein the first header (40) is horizontal; wherein the water-cooling tubes of the second plurality, of the intermediate partition (4) are provided in a vertical direction, and both sides and the bottom of the intermediate partition (4) are laid with refractory; wherein the first header (40) for the intermediate partition (4) is provided in a horizontal direction and located at the bottom of the intermediate partition (4); and the first header (40) has a lowest level for the intermediate partition (4) not lower than that of the horizontal fourth header (33) for the front wall (31) of the return chute (3), and both the first header (40) for the intermediate partition (4) and the horizontal fourth header (33) for the front wall (31) of the return chute (3) are connected by the first connecting tubes (7) for the headers (33, 40).

3. The water-cooling U-valve according to claim 1 wherein a left header (501) for the material returning partition (5) and a right header (502) for the material returning partition (5) are provided at the outsides of the left and right walls of the casing of the loop seal, respectively; wherein one of each two adjacent water-cooling tubes of the first plurality of water-cooling tubes at the rear wall (32) of the return chute (3) is diverted at the interface between the rear wall (32) of the return chute (3) and the air distribution plate (6), and is bent in a vertically upward direction and extends into the loop seal, and the diverted water-cooling tubes of the first plurality of water-cooling tubes are split into a left half and a right half in a plane where the material returning partition (5) is placed; the left half and the right half are bent to the left and right, respectively, to extend out of the casing of the loop seal in the horizontal direction, and finally, these halves enter the two headers (501, 502) for the material returning partition (5), respectively; wherein the highest levels of the two headers (501, 502) for the material returning partition (5) are not higher than that of the horizontal fifth header (13) for the rear wall (12) of the downcomer (1); wherein the two headers (501, 502) for the material returning partition (5) and the horizontal fifth header (13) for the rear wall (12) of the downcomer (1) are connected by the second connecting tubes (8) for the headers (13, 501, 502); and wherein a left header (401) for the intermediate partition (4) and a right header (402) for the intermediate partition (4) are provided at the outsides of the left and right walls of the casing of the loop seal, respectively; wherein one of each two adjacent water-cooling tubes of the second plurality of water-cooling tubes at the front wall (11) of the downcomer (1) is diverted at the interface between the front wall (11) of the downcomer (1) and the top plate (21) of the riser (2), and extends into the loop seal in a vertically downward direction, and then the diverted water-cooling tubes of the second plurality of water-cooling tubes are split into a left half and a right half in a plane where the intermediate partition (4) is placed, the left half and the right half are bent to the left and right, respectively, to extend out of the casing of the loop seal in the horizontal direction; and finally, these halves enter the two headers (401, 402) for the intermediate partition (4), respectively; wherein the lowest levels of the two headers (401, 402) for the intermediate partition (4) are not lower than that of the horizontal fourth header (33) for the front wall (31) of the return chute (3); wherein the two headers (401, 402) for the intermediate partition (4) and the horizontal fourth header (33) for the front wall (31) of the return chute (3) are connected by the first connecting tubes (7) for the headers (33, 401, 402).

4. The water-cooling U-valve according to claim 1 wherein:

the outlet header (10) for the loop seal is connected with a middle part of the drum or is connected with the drum through water-cooling tubes of a cyclone.

* * * * *